July 22, 1969  F. H. GILLERY  3,457,106
METAL-TUNGSTEN BRONZE FILMS
Filed Dec. 21, 1966

INVENTOR
FRANK H. GILLERY

BY Chisholm and Spencer
ATTORNEYS

United States Patent Office 3,457,106
Patented July 22, 1969

3,457,106
METAL-TUNGSTEN BRONZE FILMS
Frank H. Gillery, Pittsburgh, Pa., assignor to PPG Industries, Inc., Pittsburgh, Pa., a corporation of Pennsylvania
Filed Dec. 21, 1966, Ser. No. 603,547
Int. Cl. B29d 11/00; C23c 13/04, 17/00
U.S. Cl. 117—33.3        11 Claims

ABSTRACT OF THE DISCLOSURE

Coated article comprising a refractory substrate having a thin, continuous, metal-tungsten bronze film firmly adhered to a surface thereof and method of producing the article. Metal-tungsten bronze films characterized by the formula $M_xWO_3$, wherein M is a metal and $x$ is a number greater than 0 and less than 1, are produced by providing a thin, continuous film of tungsten oxide on a refractory substrate and reacting the tungsten oxide film with an alkali metal or lead to diffuse the metal into the tungsten oxide film structure.

---

Figure 1:
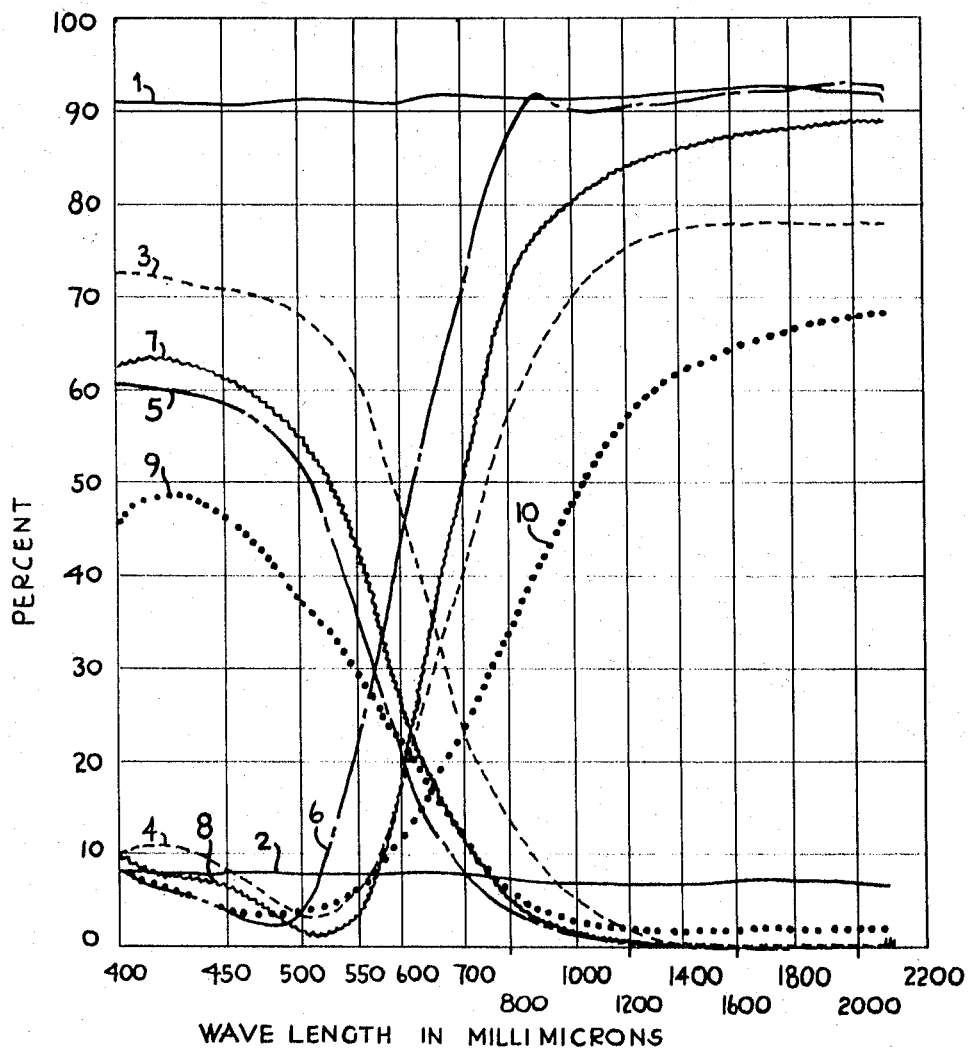

The present invention relates to coated articles and, more particularly, to such articles comprising a thin, continuous, metal-tungsten bronze film firmly adhered to a refractory substrate and methods of producing such coated articles.

The term "metal tungsten bronze" is descriptive of a series of non-stoichiometric compounds characterized by the formula $M_xWO_3$, in which M is a metal and $x$ is a number greater than 0 but less than 1. Such materials are generally considered as a solution of a metal in an oxide of tungsten.

These compounds derive their name "bronze" from the most common compound of the series, sodium tungsten bronze ($Na_xWO_3$) which for certain values of $x$ have a yellow, metallic appearance similar to that of bronze alloys of copper and tin. This name is now commonly applied to this series of compounds regardless of the metal component employed or the appearance of the compound.

Although much was known about the metal-tungsten bronze compounds, prior to the present invention processes for producing thin, continuous, polycrystalline films of such materials on refractory substrates were not known.

The crystalline metal-tungsten bronze films produced in accordance with this invention are thin, transparent continuous films. These films are firmly adhered to the substrate material and are quite durable. Such films have low electrical resistances and can be employed as electrically-conductive films. Moreover, these films exhibit radiant energy transmission and reflection characteristics which make them particularly useful as infrared radiation reflecting films. Transparent glass substrates having thin, continuous, metal-tungsten bronze films firmly adhered thereto may be glazed in buildings or other structures where it is desired to reflect infrared radiation and transmit radiation present in the visible or luminous portion of the electromagnetic spectrum.

U.S. Patent No. 2,952,575 describes the preparation and use of organic resin films having particulate sodium-tungsten bronze material dispersed therein. Such organic films cannot be employed as electrical resistances because of the particulate dispersion of the sodium-tungsten bronze material. Moreover, such films are not so durable and do not reflect infrared radiation so efficiently as a thin, continuous metal-tungsten bronze film.

Methods of producing alkali metal-tungsten bronze films on refractory substrate materials are described in patent application No. 6, 507,775, filed in the Netherlands Patent Office on June 17, 1965. The Netherlands patent application claims a filing date priority of June 26, 1964, reciting U.S. patent application Ser. No. 378,324 and now abandoned.

The Netherlands patent application describes a method of producing alkali metal-tungsten bronze films by coating a base material with a solution of salt of tungstic acid and an inorganic compound of an alkali metal and baking the coated base material in a reducing atmosphere at temperature above 400° C.

The present invention teaches the method of producing metal-tungsten bronze films by reacting a thin, firmly adhered tungsten oxide film previously applied to a refractory substrate with a metal in a substantially oxygen-free environment at a temperature greater than 480° C. to react the metal with the polycrystalline tungsten oxide film structure. The films produced in accordance with the present invention are strongly adhered to the substrate. Such adhesion results from curing the previously adhered tungsten oxide film at an elevated temperature. Moreover, when a metal oxide present in the substrate is used as a source of the metal to be diffused into the tungsten oxide film, greater adhesion results from the forces present in the transition layer at the interface of the tungsten oxide films and the substrate.

The metal diffused into the tungsten oxide film is selected from the group consisting of the alkali metals and lead. The alkali metals transmit ultraviolet radiation and reflect visible radiant energy. When diffused, the metal ions fill the interstices of the tungsten oxide polycrystalline film raising the symmetry of the crystal from triclinic to tetragonal or cubic. The valence electrons of the metal move freely in the conduction bands of the structure. Radiant energy with a frequency less than that of the natural electron frequency, such as infrared radiation, interacts with the electrons, setting them into forced oscillation and reflecting the radiation. Radiation with a frequency greater than the natural electron frequency, such as that present in the lower portion of the visible spectrum, does not force oscillation and is transmitted. Lead diffused into the tungsten oxide films exhibits similar radiant energy transmitting and reflecting characteristics. The slope of the infrared reflection curve for metal-tungsten bronze films can be shifted over a range of approximately 150 millimicrons near the infrared edge of the visible spectrum. The position of the slope of the infrared reflecting curve depends upon the metal and concentration of the metal diffused into the tungsten oxide film.

FIG. 1 is a graph having pairs of curves reproduced thereon. The curves illustrate the radiant energy transmitting and reflecting characteristics of metal-tungsten bronze films applied to transparent glass substrates. Reflection and transmission curves for a sample are both illustrated by the same type of line, viz., broken, dotted, etc.

Figure 2:
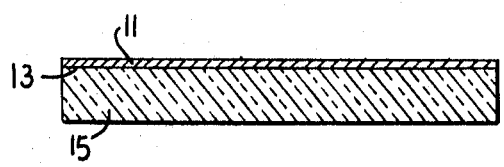

FIG. 2 is a sectional view of a coated article prepared in accordance with the present invention.

In FIG. 1 the visible (approximately 400 to 750 millimicrons) and infrared portions of the electromagnetic spectrum are plotted along the abscissa. The curves were plotted with a Beckman DK–2 Spectrophotometer using a tungsten bulb illuminant. The percent of the radiation transmitted or reflected is plotted along the ordinate. The curves illustrating reflection characteristics are plotted with reference to a front surface aluminum mirror.

Cuves 1 and 2 of FIG. 1 are plotted for purposes of comparison only. Curves 1 and 2 respectively illustrate the radiant energy transmission and reflection characteristics of an uncoated soda-lime-silicate glass microscope slide.

Curves 3 and 4 respectively illustrate the radiant energy transmission and reflection characteristics of a thin, 900 angstrom units thick, sodium-tungsten bronze film of the composition $Na_{0.66}WO_3$, firmly adhered to the surface of a soda-lime-silicate glass microscope slide. Comparison of the radiant energy reflection curves 2 and 4 for the uncoated and coated microscope slides illustrates that the metal-tungsten bronze film reflects a high percentage, approximately 75 percent, of the infrared radiation. Curve 3 illustrates that the metal-tungsten bronze film transmitted a substantial portion of the visible spectrum.

Calculations using the values plotted for curves 3 and 4 were made to determine the solar energy reflection and transmission characteristics of the sodium-tungsten bronze film. The solar energy factors used for these calculations were for solar radiation at sea level with the filmed surface normal to the sun's rays. These factors are given in Table III of "Proposed Standard Solar Radiation Curves for Engineering Use," P. Moon, J. Franklin Inst., 230 (1940). The calculations indicate that the film will transmit 57 percent of the luminous solar energy, and reflect 69 percent of the infrared radiation present in solar energy.

Curves 5 and 6 respectively illustrate the radiant energy transmission and reflection characteristics of another sodium-tungsten bronze ($Na_{0.79}WO_3$) film applied to a transparent glass substrate. Curves 5 and 6 also exhibit relatively high luminous energy transmitting and infrared reflecting characteristics. Calculations based on solar energy radiation factors indicate that the $Na_{0.79}WO_3$ film transmits 33 percent of the luminous solar energy and reflects 91 percent of the solar infrared radiation.

Curves 7 and 8 respectively illustrate the relatively high radiant energy transmission and reflection characteristics of a lithium-tungsten bronze film firmly adhered to the surface of a transparent glass substrate.

Curves 9 and 10 respectively illustrate the relatively high radiation energy transmission and reflection characteristics of a lead-tungsten bronze film adhered to a transparent glass substrate.

FIG. 2 illustrates a metal-tungsten bronze film 11 firmly adhered to a surface 13 of a substrate 15.

For purposes of illustration, the thickness of the film 11 in FIG. 2 is greatly exaggerated. It has been determined that the optimum thickness of the metal-tungsten bronze films is approximately 800 angstrom units when high luminous energy transmission is desired. Films with a thickness less than this do not exhibit maximum infrared reflecting characteristics. When thicker metal-tungsten bronze films are produced by reacting a metal in the substrate with a tungstic oxide film previously applied to the substrate, there results a concentration of the metal near the film-glass interface. There is little or no metal present in the film near the film-air interface. Such a film reflects infrared radiant energy near the glass-film interface but not at the air-film interface. Such a gradient metal concentration can be avoided by reacting the tungstic oxide film on the substrate with a metal from an external source. However, even then it is recommended that the metal-tungsten bronze film be no more than one micron thick. The infrared reflecting characteristics of thicker films do not increase significantly whereas their tendency to absorb luminous energy increases considerably as the thickness of the film is increased.

The material of the substrate 15 may be varied depending upon the use to which the coated article is to be applied. A transparent glass substrate is generally employed when the article is to be used as a transparent glazing providing a high degree of reflection of radiation in the infrared portion of the electromagnetic spectrum. When the coated article is to be employed as an electrical conductor, the substrate 15 may be a transparent glass or other non-conducting ceramic or glass-ceramic material.

The tungsten oxide films prepared for reaction with a metal comprise thin, continuous crystalline film of tungsten trioxide or partially reduced tungsten oxide characterized by the formula $WO_{3-Y}$ where Y is a number less than 1. Where the metal to be reacted with the tungsten oxide film is present in the form of a compound or in the substrate, the tungsten oxide film must be partially reduced when the metal is diffused. In such cases, reaction of the metal with tungsten trioxide produces a sodium tungstate film which is transparent but does not exhibit the desirable radiant energy transmission and reflection characteristics of the metal-tungsten bronze films. For purposes of this invention, a partially reduced tungsten oxide film will be descriptive of such films reduced to a state of oxidation intermediate that of tungsten trioxide and tungsten dioxide.

The initial tungsten oxide films may be produced on the substrate by any of several processes.

The tungsten oxide film has been produced on the substrate by known thermal vaporization techniques in a vacuum chamber. The substrate and a measured quantity of granular tungsten trioxide are positioned in a vacuum chamber. The chamber is sealed and evacuated to a pressure of at least one tenth of a micron of mercury. The tungsten trioxide is heated to a temperature of approximately 1300° C. to vaporize the tungstic oxide. The vapor condenses on the substrate, forming a thin adherent tungsten oxide film on the surface of the substrate.

A tungsten oxide film has also been produced by applying an organic solution of a tungsten halide to the substrate and then oxidizing the tungsten. A substrate was dipped into an alcohol solution of tungsten hexachloride and then held in the atmosphere above the solution to hydrolize the halide leaving a thin, adherent film on the substrate, the film being produced by hydrolysis of the halide with water vapor present in the atmosphere.

Tungsten oxide films have also been produced on the substrate by contacting the substrate with granular tungsten trioxide in a reducing atmosphere at a temperature in the range of 480° to 650° C. Under these conditions, the tungsten trioxide has a relatively high vapor pressure and is reduced to a tungsten oxide characterized by the formula $WO_{3-Y}$. The partially reduced tungsten oxide has a lower vapor pressure and condenses on the substrate in the form of a thin adherent film of a partially reduced tungsten oxide. Although it is preferred to conduct this process in a fluidized bed of tungsten trioxide, partially reduced tungsten oxide films have been produced by depositing a thing layer of tungsten trioxide on a glass substrate in a vacuum furnace and heating the furnace to 480° C. while passing hydrogen gas through the furnace.

The tungsten oxide film adhered to the substrate is then reacted with a metal in a substantially oxygen free atmosphere at a temperature greater than 480° C. to diffuse the metal into the tungsten oxide film. Temperatures in the range 480° to 650° C. are preferred to avoid deforming the substrate. An atmosphere or environment having an oxygen vapor pressure of less than about 10 microns mercury is required to prevent oxidation of the metal or, in certain instances, of the partially reduced tungsten oxide film. Thus, the reaction may take place under reduced atmospheric conditions or in an inert or controlled reducing atmosphere.

When a vaporized metal is to be diffused into the tungsten oxide film, the reaction may take place under reduced atmospheric conditions or in an inert atmosphere. The vaporized metal diffuses into the tungsten trioxide film. With vaporized metal, low oxygen vapor pressure is required to prevent oxidation of the metal.

When a metal present in the form of a compound or present in the substrate is to be deacted with the tungsten oxide film, it is preferred that the reaction take place in a controlled reducing atmosphere to insure that the tungsten oxide film is partially reduced as the reaction takes place.

Metals present in a refractory material are considered to be present in the form of an oxide. Heating the refractory substrate to a temperature greater than 480° C. causes the metal and oxygen ions present in the surface of the substrate to diffuse into the partially reduced tungsten oxide film. The dffused ions fill up the lattice structure of the partially reduced film, thereby forming the metal-tungsten bronze film.

Sodium and oxygen ions present in a soda-lime-silica glass substrate have been diffused into a partially reduced tungsten oxide film. Temperatures greater than about 480° C. are required to produce a sufficient rate of diffusion to form the metal-tungsten bronze film in a reasonable time. At lower temperatures, several hours are required to diffuse sufficient sodium metal to produce a sodium-tungsten bronze film having significant infrared reflecting characteristics.

Controlled reducing conditions are also preferred when a metal compound is used as a source of the metal to be diffused into the tungsten oxide film. Sodium chloride has been utilized as a source of sodium metal to form sodium-tungsten bronze films. At elevated temperatures the sodium and chlorine ions diffuse into the tungsten oxide film. Only trace amounts of the chlorine ions have been detected in the meal-tungsten bronze films. Such small quantities have no apparent adverse effect on the bronze film. Other compounds which may be used as a source of metal are the alkali metal oxides, alkali metal hydroxides, alkali metal halides, sodium silicate, and equivalent compounds of lead.

The tungsten oxide film and the reaction diffusing the metal therein have also been produced concurrently. This was accomplished by placing the substrate containing the metal to be diffused into a fluidized bed of tungsten trioxide. The bed was fluidized with a reducing gas and heated to a temperature of 540° C. Under these conditions the tungsten trioxide vaporized and condensed on the substrate in the form of a thin, adherent film of partially reduced tungsten oxide. The temperature of the fluidized bed was increased to 650° C. to diffuse metal and oxygen ions present in the substrate into the film, thereby producing the metal-tungsten bronze film while increasing the thickness of the partially reduced tungsten oxide film.

The preparation of thin, continuous metal-tungsten bronze films firmly adhered to the surface of a refractory substrate is explained in greater detail in the examples given below.

Example I

A sodium-tungsten bronze film was prepared on a one inch by three inch microscope slide in the following manner. A measured quantity, .0431 gram, of granular tungstic oxide was positioned on a platium strip filament supported within a vacuum chamber. The tungstic oxide was moistened with a drop of alcohol to adhere it to the filament and minimize decrepitation during heating. The microscope slide was placed in the chamber 6.15 inches away from the platium filament. The chamber was sealed and evacuated to a pressude of approximately .11 microns mercury. The temperature of the platinium filament was increased to 1300° C. to vaporize the granular tungstic oxide and produce a thin film of tungsten oxide on the microscope slide. The microscope slide was removed from the vacuum chamber and examined. A thing film of tungsten oxide 1014 angstrom units thick was adhered to the surface of the microscope slide.

The sodium tungsten bronze film was produced by diffusing sodium metal into the thin tungsten oxide film. In this example, the sodium metal present in the glass microscope slide was used as a source of sodium. The composition of the soda-lime-silica glass microscope slide was as follows: 72.41 percent $SiO_2$, 14.41 percent $Na_2O$, 7.00 percent $CaO$, 0.41 percent $K_2O$, 3.71 percent $MgO$, 0.38 percent $Na_2SO_4$, 0.06 percent $NaCl$, 1.53 percent $Al_2O_3$, 0.02 percent $ZrO_2$, 0.026 percent $TiO_2$, 0.044 percent $Fe_2O_3$, all percent by weight, and a trace of $As_2O_5$.

The tungsten oxide filmed microscope slide was positioned in a vacuum furnace. The pressure in the vacuum furnace was reduced to 0.75 micron mercury. The temperature within the furnace was increased to 650° C. This temperature was held for 33 minutes. At this temperature, the tungstic oxide film on the glass slide was partially reduced and sodium and oxygen ions from the glass diffused into the partially reduced tungstic oxide film. The microscope slide was removed from the vacuum furnace and examined.

A thin film, approximately 900 angstrom units thick, was present on the surface of the microscope slide. The film appeared yellow in reflected light and blue in transmitted light. By X-ray diffraction analysis it was determined that the composition of the film adhered to the surface of the microscope slide was $Na_{0.66}WO_3$.

Curves 3 and 4 of FIG. 1 respectively illustrate the radiant energy transmitting and reflecting characteristics of the filmed glass microscope slide produced in this manner.

Example II

A sodium-tungsten bronze film was produced on a four inch by five inch plate of single strength sheet glass. In this example, 0.22 gram of granular tungsten trioxide was moistened with alcohol and positioned on a platinum strip filament in a vacuum chamber. The glass plate was positioned 12.3 inches from the platinum filament. The chamber was sealed, evacuated to a pressure of less than one micron mercury, and the temperature of the filament increased to 1300° C. The granular tungstic oxide evaporated, depositing a thin film of tungsten oxide, approximately 1200 angstrom units thick, on the surface of the glass plate. The tungstic oxide filmed plate was placed in a stainless steel muffle furnace to produce the sodium-tungsten bronze film.

The muffle furnace was a conventional electric furnace provided with a sealed stainless steel insert to control the atmosphere surrounding the glass plate. Two stainless steel tubes were connected to the insert to permit the introduction and removal of natural gas. Access means was also provided in order that the glass plate could be positioned within and removed from the insert. The natural gas introduced into the muffle furnace was deoxygenated by passing it over platinum turnings heated to about 760° C. in an auxiliary furnace.

The tungsten oxide coated glass plate was placed inside the stainless steel insert and the access means was sealed. Natural gas was introduced into the insert at a flow rate sufficient to exhaust the air in the insert and prevent back flow. The furnace was heated to a temperature of 620° C. This temperature was held for 15 minutes to partially reduce the tungstic oxide film and react the tungsten oxide film with sodium metal present in the glass substrate. The filmed glass article was allowed to cool and removed from the furnace. The sodium-tungsten bronze film thus produced appeared yellow in reflected light and blue in transmitted light. X-ray diffraction analysis showed that the composition of the film was $Na_{0.79}WO_3$. Curves 5 and 6 of FIG. 1 respectively illustrate the radiant energy transmitting and reflecting characteristics of the sodium-tungsten bronze filmed glass plate.

This and other films produced in accordance with the method of this example had an electrical resistance of less than 10 ohms per square. Such films may be employed as transparent electrical conductors.

Example III

A sodium-tungsten bronze film was produced using a fluidized bed of granular sodium chloride as the source of the sodium metal. A glass wool plug was positioned near the bottom of a one inch diameter laboratory glassware tube. Granular sodium chloride passing through a 100 mesh screen and retained on a 200 mesh screen was introduced into the tube to a height of 6 inches above the glass wood plug. Tubing connected to the bottom of the glass tube served as an inlet for introducing natural gas into the tube. The flow rate of the natural gas was sufficient to counteract the force of gravity acting on the granular sodium chloride particles to suspend the same, thereby permitting the mass to act as a fluid. The one inch diameter glass tube was supported in a vertical furnace maintained at a temperature of 480° C. with the upper end of the tube open to, and extending into the atmosphere above the furnace. Natural gas was passed through the granular sodium chloride to displace the air entrapped therein and to suspend the particles in the manner described above.

A one inch by three inch tungsten oxide filmed microscope slide was immersed in the fluidized sodium chloride. The tungsten oxide film was evaporated onto the microscope slide in the same manner as that described in Example I. After thirty minutes, the microscope slide was removed from the fluidized bed and allowed to cool in the upper portion of the tube. Upon removal from the tube, the sodium-tungsten bronze filmed slide was examined and observed to be yellow in reflected light and blue in transmitted light.

Example IV

Tungsten oxide films produced by methods other than thermal evaporation techniques have also been reacted with metals to produce a metal-tungsten bronze film. A tungsten oxide film was produced on a microscope slide by dipping the slide into an alcohol solution of tungsten hexachloride. A 0.2 molar solution was prepared by dissolving 15.8 grams of tungsten hexachloride in 200 cubic centimeters of ethyl alcohol. The slide was dipped into the solution four times. After each dip the slide was held in the atmosphere above the solution to permit the alcohol to evaporate and the moisture present in the atmosphere to partially hydrolyze the halide, leaving a thin adherent film of tungsten oxide on the surface of the slide. Four dips sufficed to build up a tungsten oxide film 1280 angstrom units thick. This film was initially blue but changed to colorless tungsten oxide after standing in the air for about an hour.

The sodium-tungsten bronze film was produced by heating the tungsten oxide filmed glass slide in a natural gas atmosphere in a muffle furnace at a temperature of 620° C. for one hour. The natural gas was de-oxygenated by passing it over platinum turnings heated to a red heat to react the oxygen present in the gas with the methane. The sodium present in the glass microscope slide was used as a source of sodium to react with the tungstic oxide film, thereby producing the sodium-tungsten bronze film.

EXAMPLE V

A sodium-tungsten bronze film was produced in a fluidized bed of granular tungstic oxide. Apparatus similar to that described in Example III was utilized. The one inch diameter tube was provided with a six inch depth of powered tungsten trioxide. The tungsten trioxide bed was fluidized with hydrogen to remove the air entrapped in the powder, suspend the particles of tungstic oxide, and provide a reducing atmosphere. The fluidized bed was heated to 540° C. Under these conditions the tungsten trioxide vaporized and was partially reduced to a lower state. The partially reduced tungsten oxide, having a lower vapor pressure, condensed on the surface of the microscope slide, forming a thin adherent partially reduced tungsten oxide film. The temperature of the furnace was increased to 650° C. for a period of 30 minutes to diffuse the sodium and oxygen present in the glass substrate into the partially reduced tungsten oxide film to produce the sodium-tungsten bronze film.

EXAMPLE VI

A lithium-tungsten bronze film was produced by reacting vaporized lithium with a tungsten oxide film previously deposited on a glass substrate. The glass substrate was a 1 inch by 3 inch by ⅛ inch plate of a silica rich glass consisting essentially of the following composition: 96.3 percent $SiO_2$, 2.9 percent $B_2O_3$, 0.4 percent $Al_2O_3$, less than 0.02 percent $Na_2O$, and less than 0.02 percent $K_2O$. For all practical purposes, the extremely low sodium content in the glass substrate precludes the possibility of developing a sodium-tungsten bronze film. The tungsten oxide film was applied to the substrate by a vacuum evaporation technique similar to that described for Example I.

The source of the lithium for the tungsten bronze film was prepared in the following manner. Lithium metal, approximately one gram, was positioned in a laboratory glass tube measuring one inch in diameter by four inches long. The tube was of the same composition as that set forth in the preceding paragraph. The glass tube containing the lithium metal was evacuated to a pressure of 0.5 micron mercury, sealed, and heated at a temperature of 650° C. for 15 minutes. The lithium metal vaporized, depositing on the internal surface of the tube. The lithium metal also attacked the interior surface of the tube, causing it to break. Pieces of the broken tube having the lithium metal film on the interior surface thereof were collected.

The tungstic oxide coated glass substrate and several pieces of the broken lithium coated glass tube were placed inside a 1 inch diameter by 15 inch long laboratory glassware tube formed from the silica-rich glass composition previously set forth. The tube was evacuated to a pressure of 0.5 micron mercury, sealed, heated, and held at a temperature of 650° C. for 10 minutes. At this temperature the lithium metal present in the broken pieces of glass vaporized. The lithium vapor permeated the tungsten oxide film on the glass substrate, producing a lithium-tungsten bronze film. The filmed glass was removed from the tube and examined. The film appeared yellow in reflected light and blue in transmitted light. Curves 7 and 8 of FIG. 1 respectively illustrate the radiant energy transmitting and reflecting characteristics of the lithium-tungsten bronze film produced by this technique. As with the sodium-tungsten bronze films previously described, curves 7 and 8 exhibit relatively high luminous energy transmitting and infrared reflecting characteristics.

EXAMPLE VII

A lead-tungsten bronze film was developed from a tungsten oxide film evaporated on a 1 inch by 3 inch by ⅛ inch thick substrate of the high silica content glass composition set forth in Example VI. The tungsten oxide film was produced in the same manner as that set forth in Example I. The filmed substrate and a lead pellet approximately ⅛ inch in diameter were positioned in a 1 inch by 15 inch diameter laboratory glassware tube. The tube was placed in a furnace. The tube was evacuated to a pressure of 0.5 micron mercury, and the temperature of the furnace was increased to 610° C. to evaporate the lead. The temperature was held for a period of 30 minutes. The vaporized lead diffused into the tungsten oxide film, producing a lead-tungsten bronze film. The filmed glass thus produced was removed from the tube and examined. The film appeared red in reflected light and blue by transmitted light. Curves 9 and 10 of FIG. 1 respectively illustrate the radiant energy transmitting and reflecting characteristics of the lead-tungsten bronze film produced by this technique. As with the alkali metal-tungsten bronze films, this filmed glass substrate exhibits high luminous energy transmitting and infrared reflecting characteristics.

Moreover, the lead-tungsten bronze film produced in the manner described in Example VII was more resistant to moisture than the alkali metal-tungsten bronze films previously described. Although all of the metal-tungsten bronze films are firmly adhered to the glass substrate, the alkali metal-tungsten bronze films tend to be attacked by boiling water and more slowly by moisture in the atmosphere. It was concluded that the moisture reacted with the alkali metal present in the tungsten-bronze film, causing the same to deteriorate. The lead-tungsten bronze film produced in Example VII withstood boiling in water for a period of one hour before it started to deteriorate. Under the same conditions, the alkali metal-tungsten bronze films started to deteriorate after boiling in water for a period of ten minutes. The boiling water test is indicative of the ability of a filmed article to withstand attack by water vapor present in normal atmospheric conditions. Thus it was concluded that the lead-tungsten bronze film would be more resistant to moisture when glazed with the film exposed to the atmosphere. This test does not discredit the alkali metal-tungsten bronze films, but merely emphasizes that some protective coating should be applied over such films to protect them from water vapor present in the atmosphere. This may be accommodated by providing a protective coating over the film or by laminating a glass plate to the filmed glass article with the alkali metal-tungsten bronze film disposed interior of the laminate structure.

Various degrees of haze were observed in the metal-tungsten bronze films produced from tungsten oxide films developed on the surface of a substrate by hydrolysis of a tungsten halide solution as described in Example IV. The haze can be minimized by reducing the rate of the hydrolysis reaction of the halide solution on the substrate. This can be accommodated by permitting the hydrolysis reaction to take place at room temperature with a relative humidity of 50 percent or less.

The rate of hydrolysis has also been reduced by permitting the tungsten halide solution to partially hydrolyze before it is applied to the substrate. When the solution is first prepared it appears green. The solution changes to an amber color as hydrolysis takes place with water vapor in the atmosphere. The rate of hydrolysis of the amber solution on the substrate is not so great as that of the green solution. Thus, to minimize haze, it is preferred to permit the tungsten halide solution to partially hydrolyze in the atmosphere before it is applied to the substrate.

Metal-tungsten bronze films have also been produced by diffusing metal present in a transparent glass plate into both surfaces of a partially reduced tungsten oxide film. This was accomplished by positioning a soda-lime-silicate glass plate on top of a tungsten oxide film applied to a glass substrate. The assembly was heated in a reducing atmosphere to a temperature of 650° C. to diffuse sodium and oxygen ions from the substrate and the cover plate into the film.

This technique may also be utilized to introduce different metal ions into the two surfaces of the tungsten oxide film. For example, a high lead containing cover plate may be employed in conjunction with a soda-lime-silicate glass substrate. Heating the assembly in a reducing atmosphere would cause the lead and sodium ions to diffuse into the outer and inner surfaces of the tungsten oxide film.

Thus it should be understood that the thin, continuous crystalline films produced in accordance with this invention may be comprised of different metal-tungsten bronze crystals. Moreover, because the metal is diffused into the tungsten oxide film, it should be understood that even when a single metal is diffused, the composition of the metal-tungsten bronze film will not necessarily be uniform throughout the film.

I claim:
1. The process of forming a metal-tungsten bronze film on a refractory substrate which comprises:
   forming a partially reduced tungsten oxide film on said substrate, and
   reacting said partially reduced tungsten oxide film with a metal selected from the class consisting of the alkali metals and lead by heating said film in contact withe a material containing said metal to a temperature of at least 480° C. in an environment having a relative oxygen vapor pressure of less than about 10 microns mercury to diffuse said metal into said tungsten oxide film, thereby forming said metal-tungsten bronze film.

2. The process of claim 1 for forming an alkali metal-tungsten bronze film wherein the substrate is an alkali metal and oxygen containing refractory and the tungsten oxide filmed substrate is heated to diffuse alkali metal ions and oxygen ions from said substrate into said partially reduced tungsten oxide film, thereby forming said alkali metal-tungsten bronze film.

3. The process of claim 2 wherein the substrate is an alkali metal containing glass.

4. The process of claim 3 wherein the alkali metal present in the glass is sodium.

5. The process of claim 1 for forming an alkali metal-tungsten bronze film comprising contacting an alkali metal and oxygen containing refractory substrate with powdered tungsten trioxide and heating said substrate and powdered tungsten trioxide to a temperature of at least 480° C. in a reducing atmosphere to form said partially reduced tungsten oxide film on said substrate and diffuse alkali metal ions and oxygen ions from said substrate into said partially reduced tungsten oxide film, thereby forming an alkali metal-tungsten bronze film.

6. The process of claim 1 for forming a metal-tungsten bronze film comprising forming a tungsten oxide film consisting essentially of tungsten trioxide on said substrate and heating said filmed substrate in contact with a material containing a metal selected from the class consisting of the alkali metals and lead to a temperature of at least 480° C. in a reducing atmosphere to partially reduce said tungsten oxide film and diffuse said metal into said tungsten oxide film, thereby forming said metal-tungsten bronze film.

7. The process of claim 6 wherein said tungsten oxide film is formed on said substrate by vapor deposition of tungsten trioxide.

8. The process of claim 6 wherein said tungsten oxide film is formed by coating said substrate with a tungsten halide solution and said halide is oxidized to form a thin, adherent tungsten oxide film.

9. The process of claim 8 wherein said tungsten halide coating is hydrolyzed to form said tungsten oxide film.

10. The process of claim 8 wherein the tungsten halide is tungsten hexachloride.

11. The process of forming a metal-tungsten bronze film on a refractory substrate which comprises:
   forming a tungsten oxide film on said substrate, said film consisting essentially of tungsten trioxide, and
   reacting said filmed substrate with a vaporized metal selected from the class consisting of the alkali metals and lead at a temperature greater than 480° C. in an environment having a relative oxygen vapor pressure of less than about 10 microns mercury to diffuse said metal into said film, thereby forming said metal-tungsten bronze film.

References Cited

UNITED STATES PATENTS

| 2,704,420 | 3/1955 | Ohliger | 65—37 |
| 2,952,575 | 9/1960 | Baltzer | 177—33.3 |

OTHER REFERENCES

Mellor: Comprehensive Treatise on Inorganic and Theoretical Chemistry, vol. 11, 1931, pp. 750 and 751 relied upon.

ALFRED L. LEAVITT, Primary Examiner

A. GOLIAN, Assistant Examiner

U.S. Cl. X.R.

117—106, 118, 119, 124; 350—1